United States Patent
Revach

(10) Patent No.: US 10,495,045 B2
(45) Date of Patent: Dec. 3, 2019

(54) UNIFIED SYSTEM FOR WARMING VEHICLE COMPONENTS USING AN EXHAUST GAS HEAT RECOVERY SYSTEM

(71) Applicant: Ford Global Technologies, LLC, Dearborn, MI (US)

(72) Inventor: Shlomo Revach, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 15/416,855

(22) Filed: Jan. 26, 2017

(65) Prior Publication Data
US 2018/0209393 A1  Jul. 26, 2018

(51) Int. Cl.
*F02N 19/10* (2010.01)
*F01N 5/02* (2006.01)
(Continued)

(52) U.S. Cl.
CPC ............... *F02N 19/10* (2013.01); *F01N 5/02* (2013.01); *F01N 2240/02* (2013.01); *F01N 2410/02* (2013.01); *F01N 2590/11* (2013.01); *F01P 7/165* (2013.01); *F01P 2005/105* (2013.01); *F01P 2050/24* (2013.01); *F01P 2060/045* (2013.01); *F01P 2060/08* (2013.01); *F01P 2060/16* (2013.01); *F02N 2200/02* (2013.01);
(Continued)

(58) Field of Classification Search
CPC .. F02N 19/10; F02N 2200/02; F02N 2200/10; F01N 5/02; F01N 2240/02; F01N 2410/02; F01N 2590/11; F01P 7/165; F01P 2005/105; F01P 2050/24; F01P 2060/045; F01P 2060/08; F01P 2060/16; Y02T 10/16; Y02T 10/166; Y02T 10/7005

USPC ........................................................... 60/273
See application file for complete search history.

(56) References Cited

U.S. PATENT DOCUMENTS 8,628,025 B2   1/2014  Bucknell
2012/0204536 A1  8/2012  Gonze et al.
(Continued)

FOREIGN PATENT DOCUMENTS

| GB | 2429763 B | 1/2011 |
| WO | 02103198 A1 | 12/2002 |
| WO | 2011153179 A1 | 12/2011 |

OTHER PUBLICATIONS

Kevin Bennion and Matthew Thornton; "Integrated Thermal Management for Advanced Vehicle Propulsion Technologies;" Apr. 12, 2010; Presented at SAE World Congress and Exhibit; 11 pages; United States.

*Primary Examiner* — Audrey K Bradley
*Assistant Examiner* — Kelsey L Stanek
(74) *Attorney, Agent, or Firm* — David Kelley; Brooks Kushman, P.C.

(57) ABSTRACT

An exhaust gas heat recovery (EGHR) system for a vehicle is configured to selectively distribute a fluid heated by engine exhaust through a coolant path for heating an engine, a transmission and a battery during cold operating conditions until a desired operating temperature is reached. In response to receiving one or more heating requests from the engine, transmission and/or battery, a controller distributes the fluid through the coolant path according to a priority level for each heating request received, wherein the priority level for each heating request may be based on current vehicle operating conditions and/or driver demand.

15 Claims, 4 Drawing Sheets

(51) Int. Cl.
*F01P 7/16* (2006.01)
*F01P 5/10* (2006.01)

(52) U.S. Cl.
CPC ........... *F02N 2200/10* (2013.01); *Y02T 10/16* (2013.01); *Y02T 10/166* (2013.01); *Y02T 10/7005* (2013.01)

(56) References Cited

U.S. PATENT DOCUMENTS

| | | | |
|---|---|---|---|
| 2014/0000536 A1* | 1/2014 | Glassford | F01P 3/20 123/41.08 |
| 2014/0103128 A1 | 4/2014 | Patel et al. | |
| 2016/0318499 A1* | 11/2016 | Yamanaka | B60W 10/06 |
| 2018/0050685 A1* | 2/2018 | Atluri | B60K 6/40 |
| 2018/0163607 A1* | 6/2018 | Uto | B60K 11/02 |

\* cited by examiner

UNIFIED SYSTEM FOR WARMING VEHICLE COMPONENTS USING AN EXHAUST GAS HEAT RECOVERY SYSTEM

TECHNICAL FIELD

The present disclosure relates to systems and methods for warming vehicle components, including an engine, transmission and battery, using an exhaust gas heat recovery (EGHR) system.

BACKGROUND

A hybrid electric vehicle (HEV) includes an internal combustion engine (ICE) and an electric machine that is powered by a traction battery. During a cold-start condition, the engine may be forced to run in order to bring the engine to a predetermined temperature. There may also be a demand for cabin heating during cold operating conditions, which increases the period of time that the engine runs. This mode of operation may not be the most fuel efficient and there may be lost opportunities during this time period in which the vehicle could have been operated in an electric-only mode to increase fuel economy.

Low temperatures may also affect the input and output characteristics of the high voltage battery. The battery power limits may be significantly reduced resulting in limited charging and discharging capabilities. Moreover, cold temperatures change the viscosity of the transmission oil leading to a higher parasitic viscous torque. All of these circumstances adversely affect vehicle performance and fuel economy. Accordingly, there is a need for efficient systems for warming up vehicle components during cold operating conditions that reduce engine on time and increase fuel economy.

SUMMARY

According to embodiments of the present disclosure, a vehicle includes an exhaust gas heat recovery (EGHR) system configured to selectively distribute a fluid heated by engine exhaust through a coolant path for heating one or more powertrain components including the engine, transmission and battery.

In one embodiment, a vehicle is disclosed having an engine and an electric machine selectively coupled to the engine via a clutch. The vehicle includes an exhaust gas heat recovery (EGHR) system and a controller programmed to, in response to receiving a warming request from one or more powertrain components, selectively distribute a fluid heated by the EGHR system through a coolant path to the one or more powertrain components until a desired operating temperature is reached. The one or more powertrain components includes an engine, a transmission and a battery. The controller may further be programmed to, in response to receiving more than one warming request, determine a priority level of each warming request based on current vehicle operating conditions and driver demand. The controller may then distribute the fluid through the coolant path to the one or more powertrain components based on the priority level. The vehicle may further include a radiator in fluid communication with the engine and the EGHR system, wherein the controller is programmed to, in response to the EGHR system being in an inactive mode and fluid exiting the EGHR system exceeding a predetermined temperature, distribute the fluid through the coolant path to the radiator.

In another embodiment, a system for thermal management in a vehicle having an engine, a transmission and a battery is disclosed. The system includes a pump configured to supply coolant from the engine to an exhaust gas heat recovery (EGHR) system to be heated by engine exhaust. A controller is programmed to, in response to receiving one or more heating requests, operate a valve to selectively route coolant heated by the EGHR system to at least one of the engine, the transmission, and the battery according to a priority level established for each heating request. The priority level for each heating request may be based on current vehicle operating conditions and/or driver demand. The controller is also programmed to distribute the coolant heated by the EGHR system until a desired operating temperature is reached. The EGHR system includes a heat exchanger, a bypass line, and a control valve configured to selectively direct engine exhaust through the heat exchanger or the bypass line. The controller is further configured to command the flow control valve to direct engine exhaust through the bypass line responsive to the desired operating temperature being reached by powertrain systems or engine back pressure constraints. The system may further include a second valve configured to selectively route coolant supplied by the EGHR system to a radiator responsive to a coolant temperature exceeding a predetermined temperature during operation of the EGHR system in a bypass mode.

In yet another embodiment, a method for control of a vehicle having an engine with an exhaust gas heat recovery (EGHR) system is disclosed. The method includes in response to receiving one or more heating requests from at least one of an engine, a transmission and a battery, distributing a fluid heated by the EGHR system through a coolant path according to a priority level of each heating request. The priority level of each heating request is based on at least one of current vehicle operating conditions and driver demand. The fluid heated by the EGHR system is distributed through the coolant path until a desired operating temperature is reached. The EGHR system includes a heat exchanger, a bypass, and a valve configured to selectively direct engine exhaust through one of the heat exchanger and the bypass, wherein the valve is controlled to direct engine exhaust through the bypass responsive to the desired operating temperature being reached or engine backpressure constraints. The valve is controlled to direct engine exhaust through the heat exchanger responsive to at least one of an engine temperature, a transmission temperature and a battery temperature being below the desired operating temperature. Additionally, in response to the EGHR system being in an inactive mode and the fluid exiting the EGHR system exceeding a predetermined temperature, the fluid is distributed through the coolant path to a radiator for cooling Embodiments according to the present disclosure provide several advantages and benefits such as reducing engine on time during cold operating conditions, reducing parasitic torques and enhancing high voltage battery power, thereby improving vehicle performance and increasing overall vehicle fuel economy.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
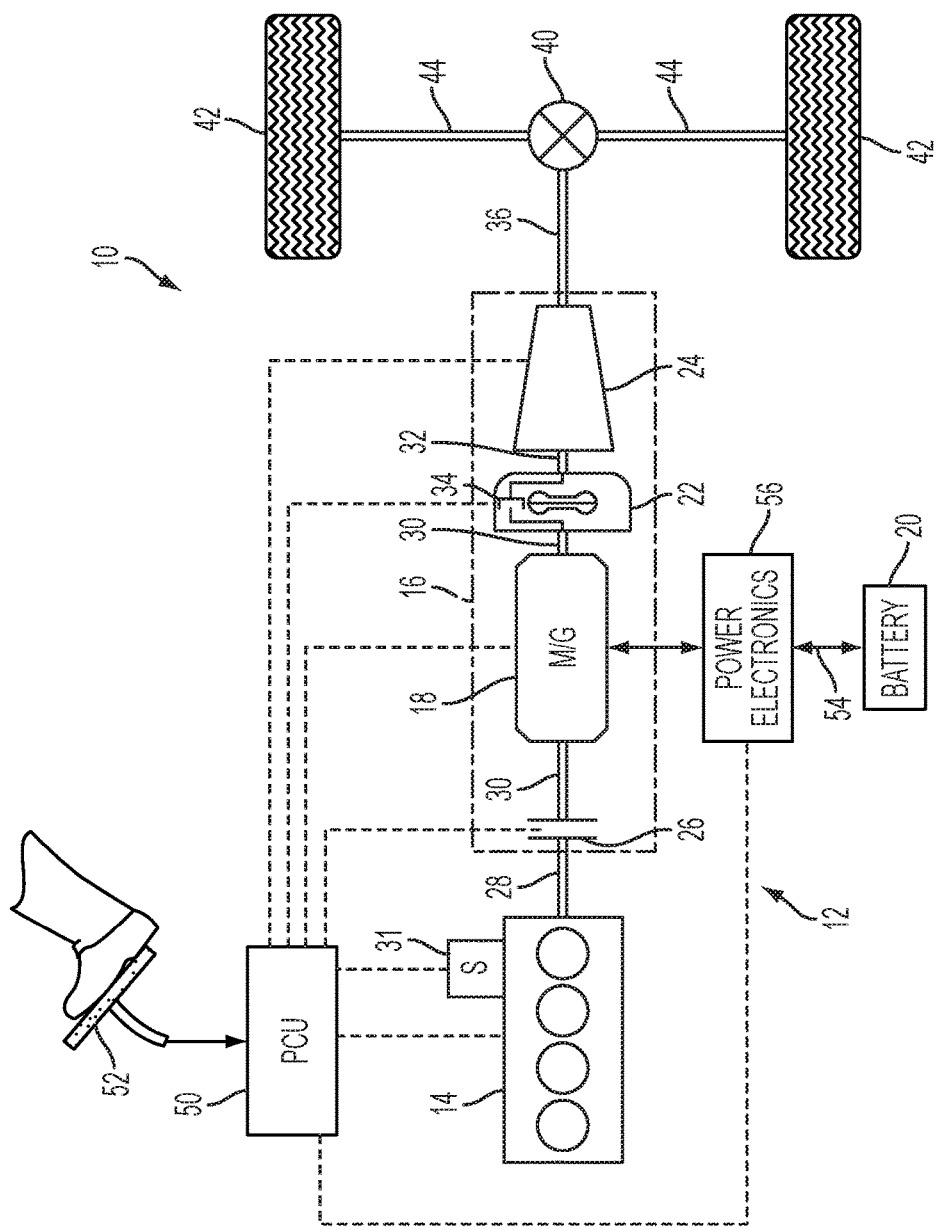
FIG. 1 is a schematic illustration of a powertrain of a hybrid electric vehicle capable of implementing one or more embodiments of the present disclosure.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20 (high voltage), a torque converter 22, and a multiple step-ratio automatic transmission, or gearbox 24. The engine 14, M/G 18, torque converter 22, and the automatic transmission 16 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping, operating M/G 18 to provide wheel torque or charge battery 20, selecting or scheduling transmission shifts, and controlling an exhaust gas heat recovery (EGHR) system to warm or heat powertrain components such as engine 14, transmission gearbox 24 and battery 20, for example. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include powertrain thermal management including the warming of components during cold operating conditions. Other examples include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

During cold ambient temperatures, engine on/run-time in HEVs may be increased due to increased energy required to heat the passenger compartment. Low temperatures may also affect the input and output characteristics of the high voltage battery. The battery power limits may be significantly reduced resulting in limited charging and discharging capabilities. Moreover, cold temperatures change the viscosity of the transmission oil leading to a higher parasitic viscous torque. All of these circumstances adversely affect vehicle performance and fuel economy. There are systems available that attempt to address cold start issues through use of individual components. However, systems that warm the engine, transmission, and battery using individual components may add cost, weight, and complexity to the vehicle. Accordingly, embodiments of the present disclosure use a single, unified system to warm the engine, battery, and transmission under cold operating conditions. In general, engine coolant is passed through an exhaust gas heat recovery (EGHR) system and is selectively routed to the engine, battery, and/or transmission until an optimal or desired operating temperature is reached.

Figure 2:
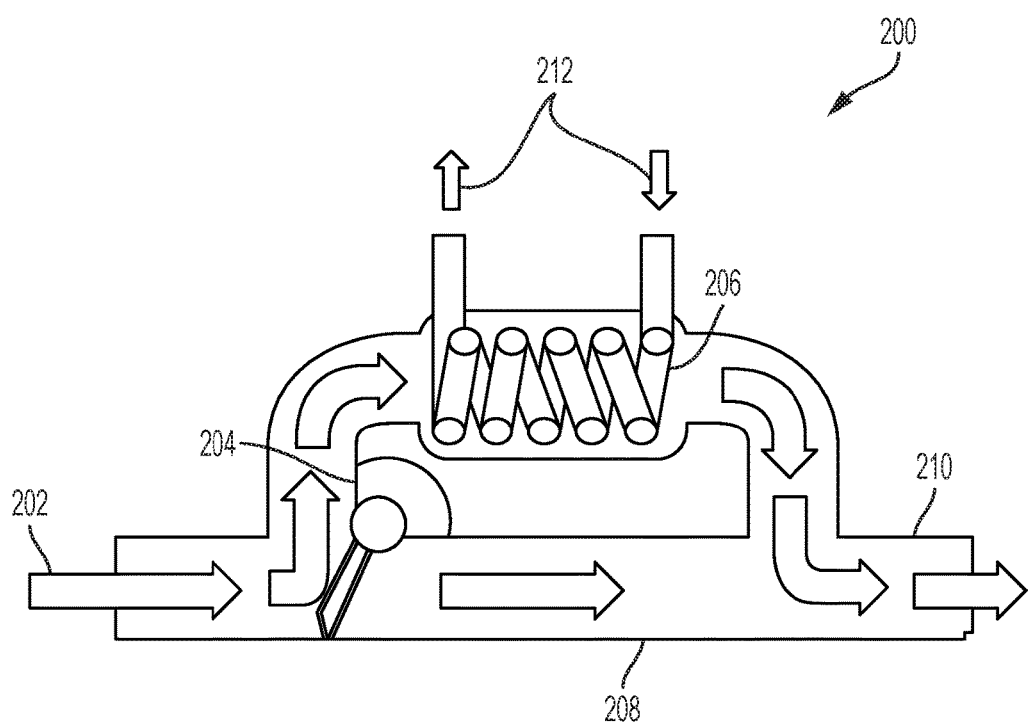
FIG. 2 is a schematic illustration of an exhaust gas heat recovery (EGHR) system capable of implementing one or more embodiments of the present disclosure.

Referring to FIG. 2, an example EGHR system 200 capable of implementing one or more embodiments of the present disclosure is provided. In particular, exhaust gas from the engine (not shown) may be directed into the EGHR system 200 at inlet 202. The EGHR system 200 is configured to selectively exchange heat between the exhaust gas from the engine (not shown) and the coolant 212, as discussed below. The EGHR system 200 has a flow control valve 204, which may be a two-way valve. The control valve 204 directs exhaust gas flow through either a heat exchanger 206 during active mode or through a bypass line 208 of the EGHR system 200 during an inactive or bypass mode. When the hot exhaust gas flows through the heat exchanger 206, it exchanges heat with coolant 212 in the coolant system. The warmed or heated coolant can then be selectively routed through a coolant path to warm up vehicle components, including the engine, transmission and battery, as is discussed in greater detail with respect to FIG. 3. Alternatively, exhaust gas may be routed through bypass 208 when heating is not required (e.g., a desired operating temperature has been reached by powertrain systems including the engine, transmission and battery). Exhaust gas may also be bypassed due to engine back pressure constraints (e.g., engine back pressure exceeding a corresponding threshold of what is acceptable for a vehicle system may require exhaust gases to be bypassed). The exhaust gas then exits the EGHR system 200 by flowing from the heat exchanger 206 and/or the bypass line 208 to an exhaust line 210 that feeds into an after treatment system or the like (not shown).

Figure 3:
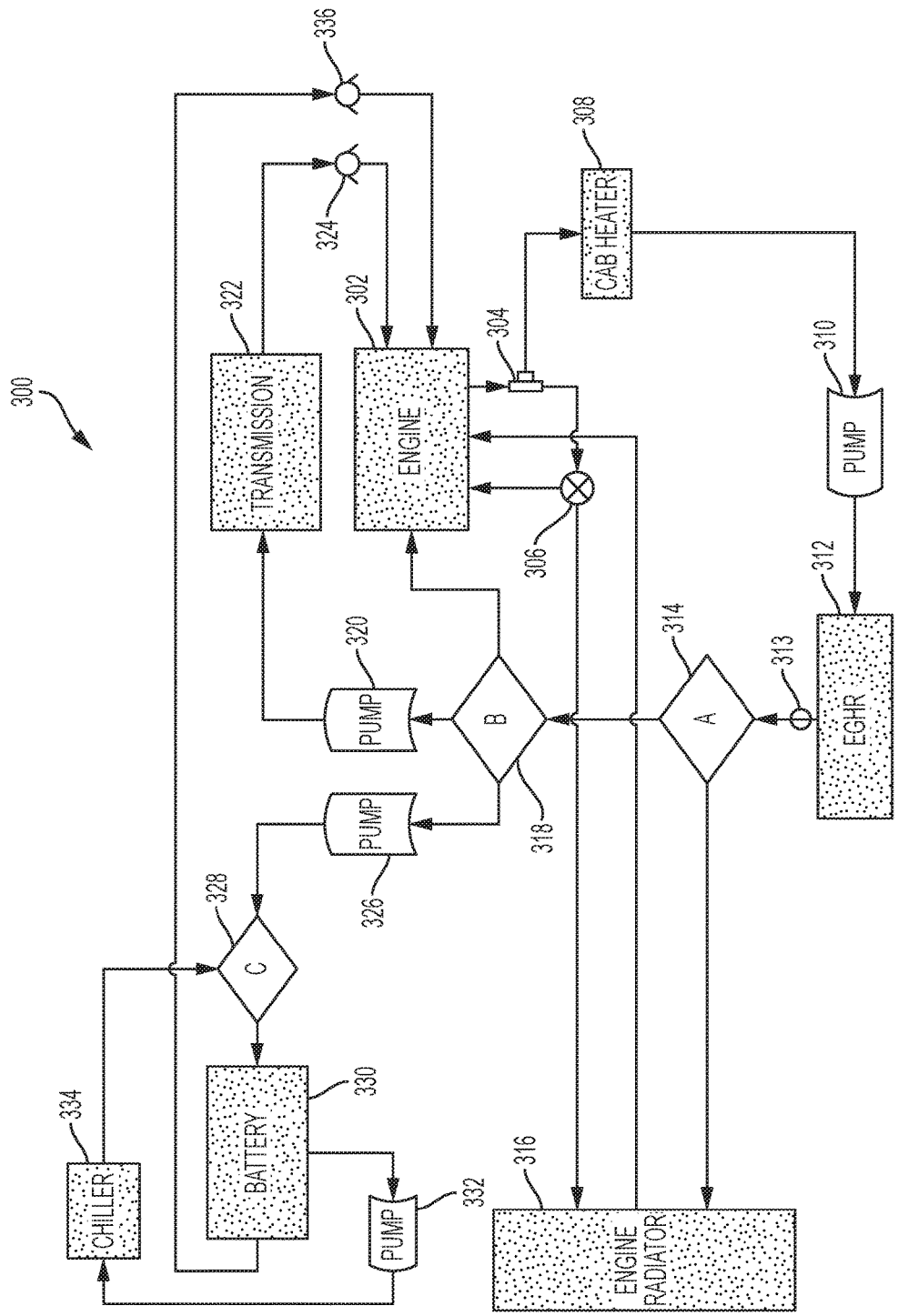
FIG. 3 is a flow diagram of a vehicle coolant circuit that includes an EGHR system in accordance with one or more embodiments of the present disclosure.

Referring to FIG. 3, a flow diagram of a vehicle coolant circuit 300 according to one or more embodiments of the present disclosure that includes an EGHR system, such as the one shown in FIG. 2, is provided. As shown, coolant flows from engine 302 to crossover assembly, or splitter, 304. The splitter 304 provides passive control over the coolant flow. In other embodiments, splitter 304 may be replaced with a valve such that all coolant flow may be selectively directed through radiator 316 via thermostat 306. The splitter 304 is configured to direct the coolant to two paths, including to thermostat 306 and cabin heater 308.

When thermostat 306 is open, the coolant flows through radiator 316, which lowers the temperature of the coolant by passing the coolant through a heat exchanger in contact with the environment. The coolant then flows from radiator 316 back to engine 302. When thermostat 306 is closed, the coolant flows back to the engine 302 without being cooled. The flow path through the radiator 316 may be used to lower the coolant temperature and in turn lower the engine temperature.

Splitter 304 also directs coolant to cabin heater 308. Cabin heater 308 acts as a heater for the HVAC system for the vehicle, and uses warm coolant to heat air for the passenger cabin or compartment of the vehicle. The heated air from cabin heater 308 is used for example in the HVAC system when a user requests a heat setting on the HVAC, for window defrost, etc. The coolant exits the cabin heater 308 and flows to the EGHR system 312 via pump 310. Within the EGHR system 312, the coolant and the exhaust gas are configured to exchange heat. If exhaust gas is flowing through EGHR system 312, heat may be exchanged between the two mediums such that the coolant temperature is increased by the exhaust gas temperature. After the coolant leaves the EGHR system 312, the coolant temperature is measured by a heat exchanger coolant temperature sensor (HECT) 313, that is either positioned in a coolant line downstream of the EGHR system 312 or is incorporated into the EGHR system 312. The coolant then flows to valve 314, where it is selectively routed to either radiator 316 or to valve 318.

In cases where the EGHR system 312 is inactive or working in bypass mode (as described in reference to FIG. 2), some of the exhaust gas may still escape into the heat exchanger area of the EGHR system 312 and cause unwanted heating of the coolant (also known as a parasitic load). This unwanted heating of the coolant may cause the coolant in the EGHR system 312 to boil over. Thus, when there is no demand for EGHR heat, valve 314 directs coolant to radiator 316 to unload the added heat and then it is routed back to engine 302.

In cases where the EGHR system 312 is active, valve 314 directs the warmed coolant to valve 318, where it is then selectively routed to the engine 302, transmission 322 and/or battery 330 to warm up the vehicle component(s) to an optimal or desired operating temperature. Valve 318 may be configured to direct warmed coolant to the engine 302, transmission 322 and/or battery 330 based on a prioritization system. Priority may be determined from current vehicle operating conditions and parameters, along with driver demand. The prioritization system may be based on any control algorithm that determines which system requires heating first, for example, the engine 302 may be given the highest priority depending on vehicle operating parameters.

For example, if it is determined that the battery 330 requires heating, then valve 318 directs the warmed coolant through pump 326. Coolant exits pump 326 and flows through valve 328 where it is directed into battery 330. The battery 330 is further connected to, and in fluid communication with, chiller 334. A pump 332 is disposed between battery 330 and chiller 334 to circulate coolant therethrough. The chiller 334 exchanges heat with a refrigerant subsystem (not shown) to provide a chilled coolant during certain conditions, such as when the battery 330 temperature exceeds a predefined threshold. Chiller 334 then circulates the chilled coolant to valve 328, where it is routed directly to the battery 330. Battery 330 is also connected to engine 302, where coolant may exit battery 330 and flow through check valve 336 that prevents backwards flow. The coolant circuit 300 may circulate warmed coolant to the battery 330 until an optimal or desired temperature is reached.

Similarly, if it is determined that the transmission 322 requires heating, then valve 318 may circulate coolant that has been warmed by EGHR system 312 to transmission 322 via pump 320. Transmission 322 is connected to, and in fluid communication with, the engine 302. Coolant may exit transmission 322 and flow through check valve 324, which prevents reversal of flow, back to engine 302. The coolant circuit 300 may circulate warmed coolant to the transmission 322 until an optimal or desired temperature is reached.

FIG. 3 illustrates a single, unified system to warm the engine 302, battery 330, and transmission 322 under cold operating conditions. As described above, engine coolant is passed through an EGHR system 312 and is selectively routed to the engine 302, battery 330, and/or transmission 322 until a desired operating temperature is reached for each subsystem. Embodiments similar to FIG. 3 provide for the ability to apply and prioritize EGHR heat to any of the engine 302, battery 330, and transmission 322 based on system constraints and/or operating conditions/parameters. For example, if both the engine 302 and transmission 322 need to be warmed up, then the system can prioritize which system requires heat first and often the engine 302 may take priority over the transmission 322 and battery 330. If this is the case, then the systems and methods according to this disclosure will first circulate warmed coolant from the EGHR system to the engine 302 until it reaches an optimal or desired operating temperature, then it would route coolant to the transmission 322 until it reached an optimal or desired operating temperature, as well.

Figure 4:
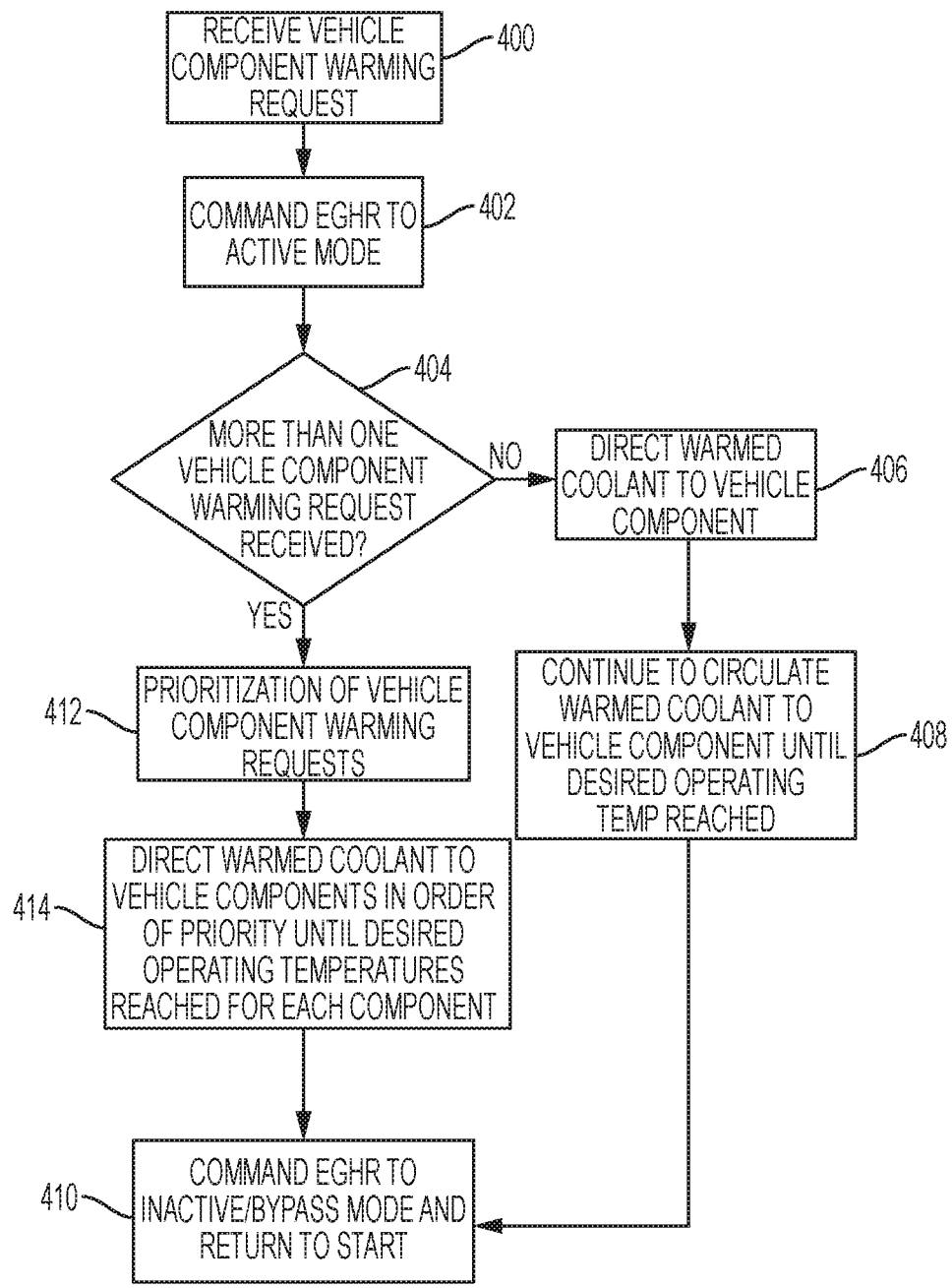
FIG. 4 is a flow chart for controlling an EGHR system in accordance with one or more embodiments of the present disclosure.

FIG. 4 illustrates a flow chart for controlling a single, EGHR system to warm the engine, battery and/or transmission under cold operating conditions in vehicles such as HEVs. The algorithm begins at step 400 when a request for vehicle component warming is received from the engine, transmission and/or battery. When a warming request is received, the EGHR system is commanded to Active Mode at step 402, whereby engine exhaust gas is used to warm coolant passing through the EGHR system's heat exchanger as described in reference to FIGS. 2-3. The algorithm then proceeds to step 404 where it is determined whether more than one vehicle component warming request was received. If no, then the algorithm proceeds to step 406 where coolant warmed by the EGHR system is directed to the vehicle component requesting warming until a desired operating temperature is reached, as shown at step 408. For example, if the transmission is requesting warming, then coolant warmed by the EGHR system would be routed to the transmission until it reached a desired operating temperature. The algorithm would then proceed to step 410 where the EGHR system is commanded to Inactive/Bypass mode and returns to the beginning.

If more than one warming request was received at step 404, then the algorithm proceeds to step 412 where the system prioritizes the vehicle component warming requests. Prioritization of which vehicle component (engine, transmission and/or battery) requires heating first, second, etc. may be based on current operating conditions, various vehicle parameters, system constraints and driver demand. For example, if both the engine and transmission are requesting warming, then the system may prioritize the engine as first to be warmed up due to vehicle operating demands and constraints. After prioritization of the vehicle component warming requests at step 412, then the algorithm proceeds to step 414 where coolant warmed by the EGHR system is directed to the vehicle components in the order of priority established in step 412 until desired operating temperatures are reached for each powertrain system. Continuing with the example above, if the engine is given priority over the transmission, then the controller would direct coolant warmed by the EGHR system to the engine until a desired operating temperature is reached. The controller would then route warmed coolant to the transmission until it reaches its desired operating temperature. The algorithm would then proceed to step 410 where the EGHR system is commanded to Inactive/Bypass mode and returns to the beginning.

Embodiments according to the present disclosure provide several advantages including the ability to apply and prioritize EGHR heat to any of the engine, battery and/or transmission using a single, unified system. The use of a single, unified system (i.e., EGHR system) eliminates costs associated with heating components using multiple systems. Embodiments according to the present disclosure will also improve vehicle performance and improve fuel economy by reducing engine-on time. Battery power limits will be improved and viscous sheer torque in the transmission will be reduced through use of the embodiments provided herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle, comprising:
   an engine;
   an electric machine selectively coupled to the engine via a clutch;
   an exhaust gas heat recovery (EGHR) system; and
   a controller programmed to:
     in response to receiving a warming request from one or more powertrain components, selectively distribute a fluid heated by the EGHR system through a coolant path to the one or more powertrain components until a desired operating temperature is reached, and in response to receiving more than one warming request, determine a priority level of each warming request based on current vehicle operating conditions and driver demand.

2. The vehicle of claim 1, wherein the one or more powertrain components includes an engine, a transmission and a battery.

3. The vehicle of claim 1, wherein the controller is further programmed to distribute the fluid through the coolant path to the one or more powertrain components based on the priority level.

4. The vehicle of claim 1, further comprising:
   a radiator in fluid communication with the engine and the EGHR system, wherein the controller is programmed to, in response to the EGHR system being in an inactive mode and fluid exiting the EGHR system exceeding a predetermined temperature, distribute the fluid through the coolant path to the radiator.

5. The vehicle of claim 1, wherein the controller is further programmed to command the EGHR system to heat the fluid with exhaust gas from the engine responsive to receiving the warming request from one of the engine, a transmission, and a battery.

6. A system for thermal management in a vehicle having an engine, a transmission and a battery, the system comprising:
   a pump configured to supply coolant from the engine to an exhaust gas heat recovery (EGHR) system to be heated by engine exhaust; and
   a controller programmed to, in response to receiving one or more heating requests, operate a valve to selectively route coolant heated by the EGHR system to at least one of the engine, the transmission, and the battery according to a priority level established for each heating request, wherein the priority level of each heating request is based on at least one of current vehicle operating conditions and driver demand.

7. The system of claim 6, wherein the controller is further programmed to distribute the coolant heated by the EGHR system until a desired operating temperature is reached.

8. The system of claim 7, wherein the EGHR system includes a heat exchanger, a bypass line, and a control valve configured to selectively direct engine exhaust through one of the heat exchanger and the bypass line, wherein the controller is further configured to command the control valve to direct engine exhaust through the bypass line responsive to one of the desired operating temperature being reached and engine back pressure exceeding a corresponding threshold.

9. The system of claim 6, further comprising:
   a second valve configured to selectively route coolant supplied by the EGHR system to a radiator responsive to a coolant temperature exceeding a predetermined temperature during operation of the EGHR system in a bypass mode.

10. The system of claim 6, further comprising:
    a second pump configured to supply coolant heated by the EGHR system and routed from the valve to the transmission responsive to a transmission heating request; and
    a third pump configured to supply coolant heated by the EGHR system and routed from the valve to the battery responsive to a battery heating request.

11. A method for control of a vehicle having an engine with an exhaust gas heat recovery (EGHR) system, comprising:

in response to receiving one or more heating requests from at least one of an engine, a transmission and a battery, distributing a fluid heated by the EGHR system through a coolant path according to a priority level of each heating request, wherein the priority level of each heating request is based on at least one of current vehicle operating conditions and driver demand.

12. The method of claim 11, further comprising:
distributing the fluid heated by the EGHR system through the coolant path until a desired operating temperature is reached.

13. The method of claim 12, wherein the EGHR system includes a heat exchanger, a bypass, and a valve configured to selectively direct engine exhaust through one of the heat exchanger and the bypass, wherein the valve is controlled to direct engine exhaust through the bypass responsive to one of the desired operating temperature being reached and engine back pressure exceeding a corresponding threshold.

14. The method of claim 13, wherein the valve is controlled to direct engine exhaust through the heat exchanger responsive to at least one of an engine temperature, a transmission temperature and a battery temperature being below the desired operating temperature.

15. The method of claim 11, further comprising:
in response to the EGHR system being in an inactive mode and the fluid exiting the EGHR system exceeding a predetermined temperature, distributing the fluid through the coolant path to a radiator for cooling.

\* \* \* \* \*